(12) United States Patent
Henderson et al.

(10) Patent No.: US 8,291,246 B2
(45) Date of Patent: *Oct. 16, 2012

(54) HIGH SPEED NETWORK INTERFACE WITH AUTOMATIC POWER MANAGEMENT WITH AUTO-NEGOTIATION

(75) Inventors: Nathan Henderson, San Jose, VA (US); Chi-Lie Wang, Sunnyvale, CA (US); Baodong Hu, Milpitas, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/277,817

(22) Filed: Oct. 20, 2011

(65) Prior Publication Data

US 2012/0089853 A1    Apr. 12, 2012

Related U.S. Application Data

(60) Division of application No. 12/505,590, filed on Jul. 20, 2009, now Pat. No. 8,046,614, which is a continuation of application No. 09/942,789, filed on Aug. 29, 2001, now Pat. No. 7,577,857.

(51) Int. Cl.
*G06F 1/32* (2006.01)
(52) U.S. Cl. ....................................... 713/320; 713/324
(58) Field of Classification Search ................ 713/320, 713/324
See application file for complete search history.

(56) References Cited

U.S. PATENT DOCUMENTS

| 5,809,223 | A | 9/1998 | Lee et al. |
|---|---|---|---|
| 5,883,894 | A | 3/1999 | Patel et al. |
| 5,938,771 | A | 8/1999 | Williams et al. |
| 6,026,494 | A | 2/2000 | Foster et al. |
| 6,148,002 | A | 11/2000 | Patel et al. |
| 6,463,542 | B1 | 10/2002 | Yu et al. |
| 6,513,128 | B1 | 1/2003 | Wang et al. |
| 6,665,347 | B2 | 12/2003 | Van Bavel et al. |
| 6,690,655 | B1 | 2/2004 | Miner et al. |
| 6,732,190 | B1 | 5/2004 | Williams et al. |
| 6,816,976 | B2 | 11/2004 | Wright et al. |
| 6,829,715 | B2 | 12/2004 | Chiao et al. |
| 7,062,595 | B2 | 6/2006 | Lindsay et al. |
| 7,577,857 | B1 | 8/2009 | Henderson et al. |
| 8,046,614 | B2 * | 10/2011 | Henderson et al. ........... 713/320 |
| 2002/0188875 | A1 | 12/2002 | Hwang et al. |

FOREIGN PATENT DOCUMENTS

WO    WO 98/30039    7/1998

OTHER PUBLICATIONS

"InfiniBand Architecture Specification" vol. 2 Release 1.0; Oct. 24, 2000; InfiniBand Trade Association consisting of 27 pages.
"PCI Bus Power Management Interface Specification" Dec. 18, 1998 PCI Special Interest Group consisting of 71 pages.

* cited by examiner

*Primary Examiner* — Chun Cao

(57) ABSTRACT

A power management circuit for managing power of a network interface is provided. The network interface includes a medium interface unit coupled to a network media supporting at least a high speed protocol and a lower speed protocol. The power management logic includes logic to determine that an event signalling entry of the medium interface unit into the lower speed protocol has occurred; and logic to force the medium interface unit into the lower speed protocol in response to a determination that the event has occurred.

12 Claims, 3 Drawing Sheets

HIGH SPEED NETWORK INTERFACE WITH AUTOMATIC POWER MANAGEMENT WITH AUTO-NEGOTIATION

CLAIM FOR PRIORITY

The present application is a Divisional Application of commonly assigned and U.S. patent application Ser. No. 12/505,590, filed on Jul. 20, 2009, now U.S. Pat. No. 8,046,614 which claims priority from and is a continuation of U.S. application Ser. No. 09/942,789, now U.S. Pat. No. 7,577,857, which was filed on Aug. 29, 2001, which are incorporated by reference herein in their entireties.

BACKGROUND OF THE INVENTION

1. Field of the Invention

The present invention relates to computer networks and to interface devices for connecting host computers to networks. More particularly, the present invention relates to power management in high speed network interface devices supporting multiple link speeds.

2. Description of Related Art

Computer systems often include network interfaces that support high speed data transfers between a host computer and a data network. Such computer systems include an adapter such as a Network Interface Card, (NIC), or a chip for the network interface on the motherboard. Such adapters typically connect to a host processor via a bus.

Many computer systems include power management logic which puts the system to sleep, or in a lower power mode, in response to activity in the system. When the system is asleep, for example, the operating system (OS) ceases operation. To bring the system awake, the operating system must be reloaded, such as through a boot sequence. When the operating system is inactive, the power consumed by the system is reduced. Such systems can be said to have an OS-present state, and an OS-absent state. Protocols have been developed by which remote management systems can wake up a system in an OS-absent state, by sending special wake up packets which the network interface is adapted to recognize without host assistance.

In the last few years, host adapters that communicate with any type of network medium have been required to operate in a variety of power managed modes. The basic idea of a power-managed system consists of the following: when a host is not in use, it can be allowed to go into a lower power-state which allows for significant power savings. This is preferable to a complete shutdown, which requires a lengthy boot-up process to allow work to continue. In lower power states, a host monitors certain possible events that would cause it to >wake-up.=These events could be a keystroke, movement of the mouse, phone ring, or a signal from a local area network (LAN). In the case of Ethernet networking, certain packets can be enabled to wake-up a host computer at any point within the network. This is a very useful feature since it allows network administrators the ability to maintain and upgrade systems from a remote location during non-working hours. It is possible for software to manage the power states of an adapter in order to ensure compliance with power consumption specifications, but there are many times when software becomes unavailable (Common operating system OS crashes in Microsoft Windows systems, power outages, and user intervention).

Since wake-up devices need to remain operational in order to monitor wake-up events, they are allocated power in order to perform their function. However, specifications for standard bus systems, such as the PCI 2.2 Bus Specification and the InfiniBand 1.0 Specification, place strict power requirements on wake-up devices. Unfortunately a Gigabit Ethernet adapter cannot operate at Gigabit speeds and comply with these power requirements using available technologies. In the case of the PCI 2.2 specification this power allotment is 1.2 watts, and for InfiniBand it is 1.3 watts. In both these cases it is impossible with today=s technology to maintain a Gigabit Ethernet link and consume less than 1.2 watts. Cutting edge technology seems to suggest that we may see a Gigabit physical layer (PHY) chip consuming a little less than 1.0 watt in the next few years, but a Gigabit PHY is only part of the power consumption needed for a wake-up apparatus to work at Gigabit speeds. Many experts would argue that we will never see a Gigabit adapter consuming less than 1.2 watts. However, not being able to maintain a Gigabit link in a power-managed adapter in a lower power mode has not been an important issue since a high speed networking connection is not necessary to receive a wake-up packet. When the host is >asleep=it is only necessary that it is able to receive a packet—how fast it gets there is of no importance, therefore Gigabit adapters can negotiate to slower speeds before going to sleep.

At the present time, software manages the power states of adapters. When a host plans to go to sleep, host software negotiates to slower networking speeds to save power. However, there can be times when a host attempts to be in a sleep-mode when software intervention is impossible. This can occur when the OS is inoperative or after power is restored following a power-loss. 10/100 Ethernet adapters can be in a fully operational state and still consume less than 1.2 watts whether operating in the 10 M bit or 100 M bit mode. So, the fact that software is not always available to manage power-states of 10/100 Ethernet adapters is not an issue. Since a Gigabit Ethernet adapter cannot be run within the specified power in the sleep mode, a new method or apparatus is needed to power manage the adapter in the absence of software control.

Accordingly, is desirable to provide a solution to this power management problem associated with high speed communication protocols that consume greater power than specified for the host systems in lower power modes, that is operable when the host software does not have access to the network interface or is not operating.

SUMMARY OF THE INVENTION

The present invention provides automatic power management for Gigabit Ethernet adapters, and other high-speed network interfaces, which satisfies lower power specifications of modern standard bus systems, and allows network interfaces configured as wake up devices to be appropriately power managed, all without the intervention of host software. When host software is unable to manage the power-states of an adapter, logic consisting preferably of hardware circuitry, or other logic resources on the network interface, according to the present invention guarantees compliance with power management specifications in order to avoid physical damage to the adapter and to the system environment.

Embodiments of the present invention include computer system that comprises a host processor and a network interface. The host processor includes resources supporting a full power mode, a lower power mode and a power down mode, as seen in standard system bus specifications such as PCI and InfiniBand. The network interface is coupled to the host processor and to the network. The interface includes memory that stores data packets in transit between the host processor and network. It includes a medium interface unit coupled to network media supporting at least a high speed protocol, such as a Gigabit Ethernet or high-speed InfiniBand, and a lower speed protocol, such as one of 10 Mb and 100 Mb Ethernet or a lower speed InfiniBand. Power management circuitry forces the medium interface unit to the lower speed protocol in response to an event signaling entry of the lower power mode. In the lower power mode, the network interface consumes less than the specified power when executing the lower speed protocol. However, the interface consumes greater than the specified power when executing the high speed protocol. For example, the network interface in the lower power mode consumes less than 1.3 watts for an InfiniBand host bus system, and less than about 1.2 watts for any PCI host bus system.

Embodiments of the present invention also includes logic in the network interface operating in the lower power mode, and using the lower speed protocol to detect a pattern in incoming packets. In response to the detection of said pattern, the logic issues a reset signal to the host processor. Thus, the network interface operates as a wake-up device in the lower power mode, using the lower speed protocol.

Also, embodiments of the present invention are adapted for use with a host processor that monitors the network interface for a wake-up event involving a loss of link or a change of link status on the network interface. In these embodiments, the power management logic circuitry blocks signals indicating said wake-up event for a time interval during which the power management logic circuitry forces the medium interface unit to the lower speed protocol.

In yet other embodiments of the present invention, the host processor includes a system bus coupled to the network interface. The system bus has a full power mode, a lower power mode, such as an auxiliary power mode, and a power down mode. In various embodiments, an event signaling the lower power mode comprises a loss of power on the system bus, or signal generated by the host processor under software control.

The present invention is also embodied by a method executed in a network interface apparatus forcing the apparatus to execute the lower speed protocol upon transition from the full power mode to the lower power mode using logic on the network interface apparatus. Such method operates as explained above in connection with the computer system embodiment.

The present invention is further embodied by an integrated circuit for use in a computer system as described above, where the integrated circuit includes the network interface components described above.

Accordingly, the present invention provides a solution to the power management problems of high-speed network interface devices, which much satisfy lower power mode specifications while operating as wake up devices in network systems.

Other aspects and features of the present invention are described below with reference to the figures.

DETAILED DESCRIPTION

Figure 1:
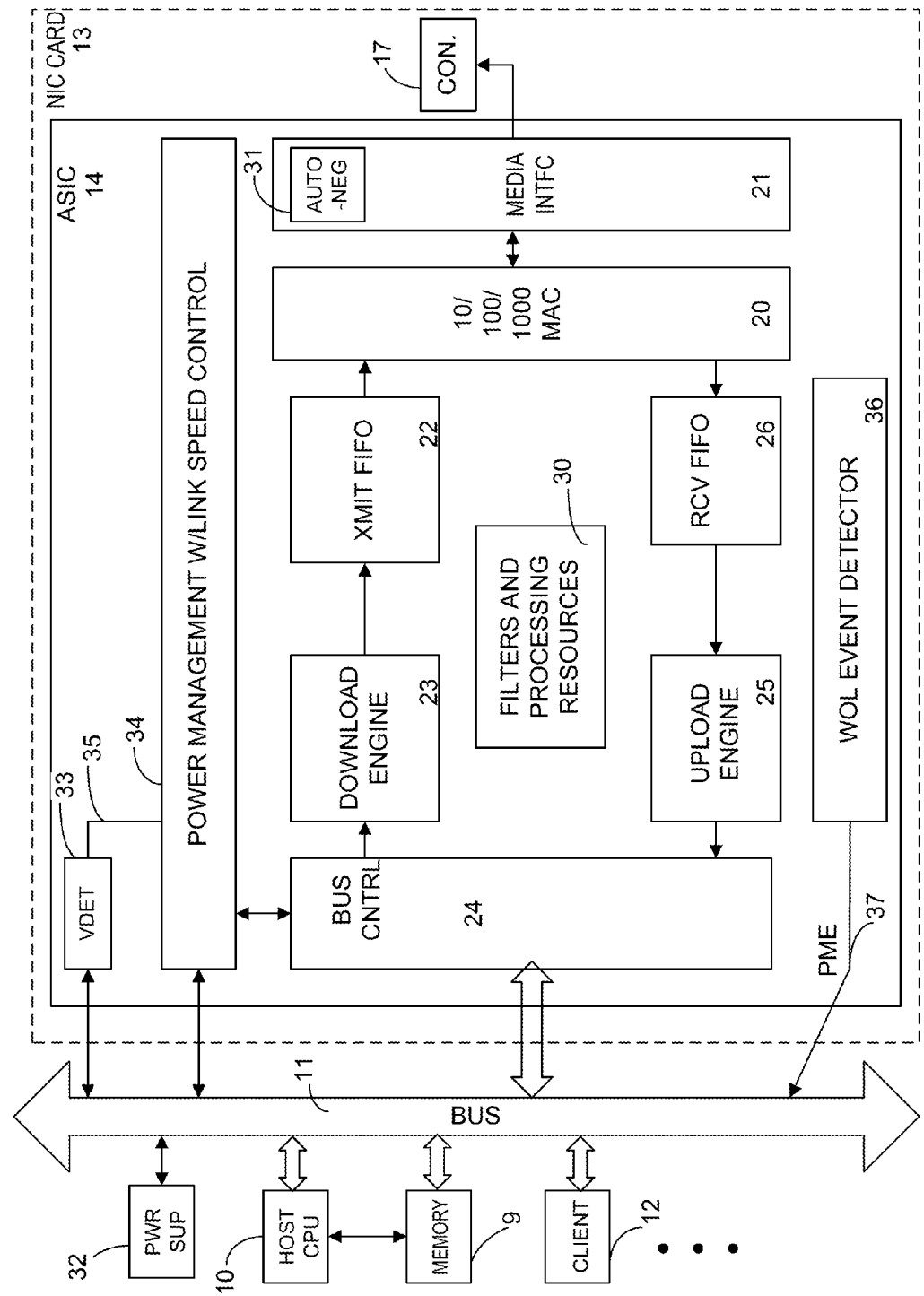
FIG. 1 is a simplified diagram of a computer system including the network interface with power management according to the present invention.
Figure 2A:
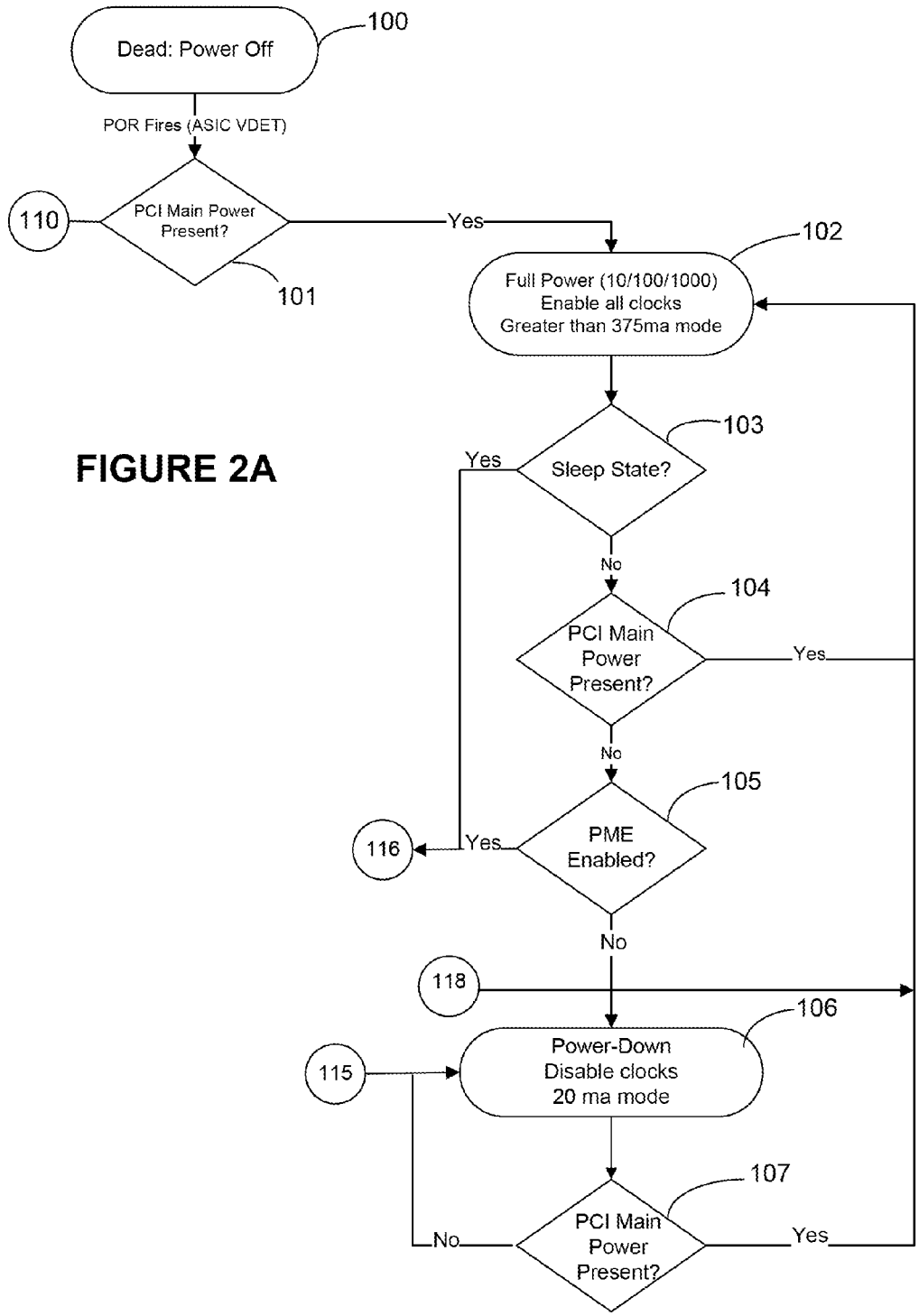
FIGS. 2A and 2B are a flow diagram illustrating a power management process on a network interface according to one embodiment of the present invention.
Figure 2B:
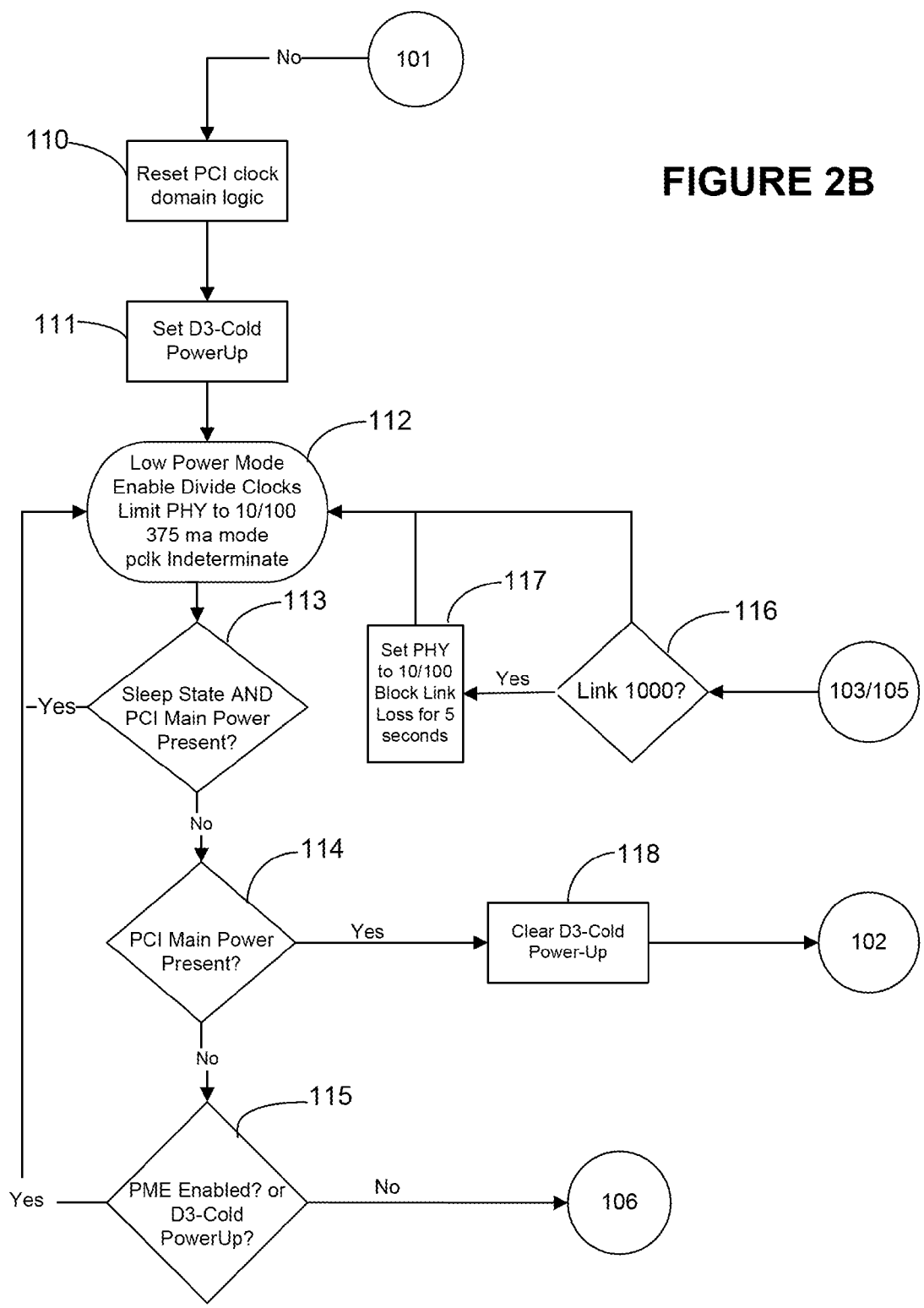

A detailed description of embodiments of the present invention is presented with reference to FIGS. 1, 2A and 2B.

FIG. 1 provides a basic structural diagram of an embodiment of a computer system having a host CPU 10 coupled to a bus system 11, such as a bus compliant with a standard such as PCI or InfiniBand. CPU memory 9 is coupled to the CPU 10 and to the bus 11. The bus 11 interconnects a plurality of bus clients, including client 12 and the NIC 13 shown with expanded functional blocks. The NIC 13 includes an application specific integrated circuit (ASIC) 14. The ASIC 14 includes network interface functions for a Gigabit ETHERNET interface in this particular embodiment. Other embodiments provide interfaces to other types of the network media and protocols, including InfiniBand for example. In addition to the ASIC 14, other components are interconnected by and supported by the circuit board of the NIC 13. For example, a BIOS ROM (not shown), and a connector 17 to the network media may be found on the circuit board of the NIC 13.

The ASIC 14 may be coupled to the host by other data paths. Also, the ASIC may be on the same board (motherboard) as the host. Further, the ASIC may be implemented as a module in a highly integrated system-on-a-chip design.

The ASIC 14 includes medium interface unit supporting multiple protocols, including in this example a MAC structure 20 that supports 10 Megabit Ethernet, 100 Megabit Ethernet and Gigabit Ethernet, coupled to medium interface circuitry 21 for connection to connector 17, for example any of a variety of known connectors for electronic or optical links. Other embodiments support wireless ports, and include radios and antennas. The MAC structure 20 is also coupled to a FIFO based transmit packet buffer 22 which is driven by a download engine 23 embodied on the ASIC 14. The download engine 23 is coupled to a bus controller 24. The bus controller 24 is also coupled to an upload engine 25. The upload engine 25 is coupled to a FIFO based receive packet buffer 26 which is connected to the MAC structure 20. In FIG. 1, the arrows on the lines connecting the boxes 20, 21, 22, 23, 24, 25 and 26 indicate the directions of data flow. Thus, the illustration of the ASIC 14 includes ordinary elements of a network interface controller chip.

Still referring to FIG. 1, the ASIC 14 further includes filters and data processing resources 30 coupled to packet buffers 22 and 26, and to the upload and download engines 24 and 25, for managing the transferring of packets through the packet buffers. The filters and processing resources 30 also manage configuration registers in coordination with the bus controller 24 for the network interface. Further, the filters and processing resources 30 provide indications and interrupts to the host system via the bus controller 24, including such indications as loss of link indications, or other signals that would cause the host CPU to attempt to reset the network interface, or perform other diagnostic functions.

In support of the multiple protocols that are served by the medium interface unit, auto negotiation logic 31 is provided on the chip. The auto negotiation logic performs standard protocols published for example are the IEEE 802.3 standards committees, to establish links with remote devices on the network. See for example U.S. Pat. No. 6,026,494 and U.S. Pat. No. 6,140,002, for a discussion of standard auto negotiation processes. Basically, the auto negotiation logic manages a protocol by which the adapter detects activity on the connected medium that suggests a link to another device across the network. When a link is detected, the adapter negotiates communication parameters with the remote device. The communication parameters typically resolve to the highest performing common operating protocol that can be used on the link. Thus, if a Gigabit Ethernet interface is connected to the link in this example, the auto negotiation logic will resolve to a Gigabit Ethernet protocol. If a 10 Megabit Ethernet or 100

Megabit Ethernet interface is detected during a negotiation, then the lower speed protocol is established on the local device.

Also, the network interface card 13 includes a wake on LAN event detector 33. Even if the host CPU 10 has not successfully booted up, is asleep, or is otherwise not running, the network interface can detect a wake-up packet or other alert packet received from the network, by matching a pattern in the received packet(s) using a wake-on-LAN event detector 36. If the wake-on-LAN event detector 36 indicates that a wake-up packet or other alert packet has been received, then it issues a signal (e.g. PME for a PCI bus system) on line 37 to the host system, which results for example in the host CPU trying to wake up.

Also shown in FIG. 1 is a power supply 32 coupled to the bus 11. The power supply 32 distributes power via the bus 11 to devices on the bus, and supports a full power mode, an auxiliary lower power mode, and a power down mode. The bus controller 24 on the adapter detects the power mode according to the specifications of the particular bus 11, and communicates with power management logic 34. The power management logic 34 according to the present invention includes link speed control circuitry, which is coupled with the auto negotiation logic 31. Also, a voltage detector 33 on the ASIC 14 detects power levels on the bus 11, and issues control signals known as power on reset signals on line 35. The power on reset signals on line 35 are distributed amongst control functions in the ASIC 14, including the power management block 34. The power management logic 34 performs a number of functions associative with managing power consumption on the ASIC 14. Such functions include turning off clocks to parts of the chip that are not in use, dividing down the clocks to slower speeds when higher speeds are not necessary, and restricting the amount available memory on the part that is enabled. To achieve lower power consumption specifications, such as less than about 1.3 watts, during the auxiliary power mode or sleep mode for the device, the sinus of devices, the speed of operation, in the power consumption of individual devices in the chip are modified.

According to the present invention, the power management logic also includes link speed control circuitry. During sleep or other lower power modes, in which the wake on LAN event detector 33 is enabled, the link speed control circuitry forces the medium interface unit to a slower speed protocol which consumes significantly less power then the higher speed Gigabit Ethernet protocol. Thus, the adapter supports at least one higher speed protocol which consumes more power than is available in a lower power mode required according to the specifications of the device. It also supports at least one slower speed protocol which consumes less power. The power management logic forces the device into the slower speed protocol for support of the wake on LAN event detector 33, or other low power monitoring activity.

The power management logic is implemented on the ASIC 14 as a dedicated state machine in preferred embodiments. Alternative embodiment implement the state machine using code stored on the ASIC and executed by the processing resources on the chip. Also, embodiments may use a combination of code executed on the chip and dedicated circuitry. The logic operates independent of host software, and is therefore operable when the host system operating system is not.

Aspects of this invention can be understood by studying the flow diagram shown in FIGS. 2A and 2B, designed for a single integrated circuit implementation of a 10/100/1000 PCI Ethernet controller. This diagram describes a state machine that always begins from the dead, or power-off, state 100. From any of the other states in this diagram it is assumed that a transition to the dead state 100 can be made any time power is removed. For simplicity these state transitions were not included in the diagram.

From the Dead State 100, a transition will occur any time power is applied to the chip to enable its functionality. At this point a voltage divider circuit is used to monitor the source of the power that is being applied to the chip (Power On Reset POR circuit fires). If it is observed that power is available from the PCI main power rails (block 101), the Power Management state machine will automatically transition into its Full Power State 102. In the Full Power State 102, all clocks within the chip are enabled to operate at full speed and the physical layer PHY (the portion on the chip dedicated to the actual transmission and reception of bits on the wire) is allowed to negotiate to the fastest speed possible. In this state the power consumed comes from the bulk source of power, not auxiliary power. Auxiliary power is limited to 1.2 watts (375 ms @3.3V).

There are two events that can cause a transition out of the Full Power State 102. Either software places the adapter into a sleep state (block 103) (D1, D2 or D3 as defined by the PCI 2.2 specification), or power is removed from the PCI main supply (block 104). If the adapter is placed into a sleep state by system software, it should have also been previously instructed by the host operating system or drivers under control of the operating system, to negotiate to a slower speed protocol. Since the failure of host software to operate properly would lead to physical damage, the network interface of the present invention has a fail-over mechanism to save itself in the case that host system software has placed it into a sleep state without renegotiating to a slower speed. In the case that the adapter has been placed into a sleep state without previously negotiating a slower operating speed, this state machine will send control signals to the PHY to force it to renegotiate to a 10/100 speed (block 117). If it is impossible to negotiate to one of these slower speeds, communication (the link) will be terminated to avoid physical damage to the adapter and/or host computer. An interesting corner case arises when the hardware automatically renegotiates to a 10/100 speed. During the negotiation process the communication link is dropped momentarily, which in turn can be considered to be a >wake-up event=by the host. This is referred to as wake on link change. If host is woken up just after it tried to put the adapter to sleep an infinite loop of sleep→wake-up→sleep could be entered. This situation has been avoided in embodiments of the present invention by automatically blocking the link change information to the wake-up logic in the chip during the renegotiation process. Once the PHY is running at a 10/100 speed the state machine can enter the Low Power State 112.

The other event that can cause a transition out of the Full Power State 102 is the removal of the PCI Main bulk power (block 104). If this event occurs, the only power supply left is the auxiliary power. If main power is removed, and the adapter was enabled as a wake-up device at the initial boot sequence (block 105) (the PME Enable bit set in the PCI Power Management configuration register), or if the adapter has been placed in a sleep state at block 103, then the circuitry will transition to block 116 of FIG. 2B, as a first at the process for a transition to the Low Power State 112, shown in FIG. 2B. If at block 105 in FIG. 2A, it is determined that the adapter was not enabled as a wake-up device, then the circuitry transitions to the Power Down State 106. In the Power Down State 106, all clocks are disabled and the circuitry is conditioned for a mode that consumes less than 20 m Amps. In the Power-Down State 106, the algorithm monitors main power (block 107). If the main power on the bus is determined to be present, then the process moves back to the Full Power State 102.

The Low Power State 112 is typically entered into from the Full Power State 102 via block 103 or block 105, as described before. However, the Low Power State can also be entered into from the Dead State 100 via block 101. For example, if the system is powered on using only auxiliary power, it will be determined that main power is not present in block 101. This will happen in many systems if they are in a sleep state when a power outage occurs. When power is restored, these systems will only reapply auxiliary power, they will not completely reboot. This scenario we refer to as a D3-cold power-up. If this occurs and the hardware does not have a self-mechanism to automatically enable itself as a wake-up device, the system will lose its capability to be remotely managed. This could pose quite a problem for a large organization after any power outages. System vendors can ensure that there is enough auxiliary power for self-enabling of wake up functionality by ensuring that there is enough auxiliary power for every possible wake-up device, or by using an apparatus as described in our co-pending U.S. patent application No. 09/322,378; filed: 28 May 1999, entitled "Low-Power Apparatus for Power Management Enabling.," invented by Nathaniel Henderson, Eric Davis, Kirk Blattman and Glenn Connery, which application is incorporated by reference as if fully set forth herein. Given that there is enough power to perform the wake-up function, the hardware must enable itself to perform this function provided that a D3-cold power-on has occurred. The hardware enables itself during the transition from the Dead State 100 to the Low Power State 112 by resetting the PCI clock (or other bus clock) domain logic (block 110). The PCI domain logic consists of the logic which is clocked by the bus clock. Although the PCI clock is not running during this transition, the logic is reset by applying a reset signal while multiplexing in another clock which is running. This ensures that the reset signal is propagated through the PCI domain logic. Next, the continues the self-enabling process by setting the D3-cold power-up (block 111). The D3-cold power-on bit is cleared once main PCI power is restored, since it will no longer be needed to maintain the Low Power State 112.

In the Low Power State 112, the process continues to monitor for the sleep state condition and for main power present on the host bus (block 113). If the adapter leaves the sleep state, then the process determines whether the main bus power is present in block 114. If the main power is present at block 114, then the process clears the D3-cold power-up bit (block 118) and transitions to the Full Power State 102 shown in FIG. 2A. If at block 114, main bus power is not present, then the hardware determines whether the PME bit is set for whether a D3-cold power-up condition has occurred. If one of these events is true, then the process remains in the Low Power State 112. If neither of these is true, then the process transitions to the Power Down State 106 shown in FIG. 2A.

As mentioned before, the low power state 112 is usually entered from the Full Power State 102 via block 103 or block 105 of FIG. 2A. In the transition from blocks 103 and 105, the algorithm first ascertains whether the Gigabit link is operating (block 116). If the Gigabit link is operating, then the renegotiation logic is forced to set the link to a 10 or 100 Mb protocol. Further, indications to the host which would cause reset on this transition, such as a link lost indication are blocked for a time interval so that reset-power up loops are not caused. In this example, the time interval is about five seconds. Thus, the adapter will be allowed to enter the Low Power State 112 if it can successfully negotiate to a 10/100 speed. Otherwise the adapter must go into a Power Down State 106 in which it can only consume 20 ma @3.3V or 66 mW of power, for this PCI example. In order to achieve such extremely low power consumption, virtually the entire chip must be shut down. The medium interface unit (PHY) is completely isolated from the power source and the only clock operative in the chip is the one that goes to the power management state machine running the process the FIGS. 2A and 2B. All other clocks are disabled and an external signal is activated to isolate any other circuitry on the adapter board that might cause the power consumption to rise above 66 milliwatts.

In order to meet the 1.2 W power requirements for a Gigabit adapter, the power savings do not come only from having the medium interface unit reduce its communication speed. Almost every part of the Ethernet adapter circuitry must be modified (increased in size, speed, and power consumption) in order to deliver Gigabit functionality. In order to achieve power consumption that is equivalent to a 10/100 Ethernet adapter, many other methods must be employed at the same time that the medium interface unit portion is negotiating to a 10/100 speed (The transition from the Full Power State 102 to the Low Power State 112). These methods include: 1) Turning off clocks to parts of the chip that are not in use, 2) Dividing down the clocks to a slower speed (less switching=less power consumed), and 3) Using less of the available memory.

Automatic power management according to the present invention for Gigabit Ethernet, and other high speed protocols that have high speed modes that consume more power than in available in a lower power mode, allows wake up devices to be appropriately power managed without the intervention of host software. When host software is unable to manage the power-states of an adapter, the present invention a guarantees compliance, and avoids physical damage to the adapter and the system environment.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A power management circuit for managing power of a network interface, said network interface including a medium interface unit coupled to a network media supporting at least a high speed protocol and a lower speed protocol, said power management circuit including a state machine having a full power state, a low power state, and a power down state, said power management circuit comprising:
   logic to determine that an event signalling entry of the medium interface unit into the lower speed protocol has occurred;
   logic to force the medium interface unit into the lower speed protocol in response to a determination that the event has occurred; and
   logic to renegotiate from the high speed protocol to the lower speed protocol in response to an event signalling entry of said lower power state, and to enter the power down state in the event the lower speed protocol is not successfully negotiated.

2. The power management circuit according to claim 1, wherein the network interface consumes a relatively lower amount of power when executing the lower speed protocol as compared with the high speed protocol.

3. The power management circuit according to claim 1, wherein the network interface consumes less than about 1.3 watts when executing the lower speed protocol.

4. The power management circuit according to claim 1, further comprising:
   logic to use the lower speed protocol to detect a pattern in incoming packets, and in response to detection of said pattern, to issue a reset signal to a host processor.

5. The power management circuit according to claim 1, further comprising:
   logic to generate indications of a wake up event involving a loss of link or a change of link; and
   logic to block signals indicating said wake up event for a time interval during which the logic to force the medium interface unit into the lower speed protocol forces the medium interface unit into the lower speed protocol.

6. The power management circuit according to claim 1, wherein the event signalling entry into the lower speed protocol comprises at least one of a loss of power on a system bus and a signal generated by a host processor.

7. The power management circuit according to claim 1, further comprising:
   logic to turn off clocks to parts of the integrated circuit that are not in use;
   logic to divide down the clocks to slower speeds; and
   logic to restrict an amount of available memory on a part that is enabled.

8. The power management circuit according to claim 1, wherein the logic to determine that an event signalling entry of the medium interface unit into the lower speed protocol has occurred and the logic to force the medium interface unit into the lower speed protocol in response to a determination that the event has occurred are to operate independent of software of a host processor.

9. A method for managing power of a network interface, said network interface including a medium interface unit coupled to a network media supporting at least a high speed protocol and a lower speed protocol, said method comprising:
   in a power management circuit including a state machine having a full power state, a low power state, and a power down state,
      determining whether an event signalling that the medium interface unit is to enter into the lower speed protocol has occurred;
      forcing the medium interface unit into the lower speed protocol in response to a determination that the event signalling that the medium interface unit is to enter into the lower speed protocol has occurred,
      renegotiating from the high speed protocol to the lower speed protocol in response to an event signalling entry of said lower power state, and
      entering the power down state in the event the lower speed protocol is not successfully negotiated.

10. The method according to claim 9, further comprising:
    in the power management circuit,
       detecting a pattern in incoming packets; and
       in response to detection of said pattern, issuing a reset signal to a host processor.

11. The method according to claim 9, further comprising:
    in the power management circuit,
       generating indications of a wake up event involving a loss of link or a change of link; and
       blocking signals indicating said wake up event for a time interval during which the logic to force the medium interface unit into the lower speed protocol forces the medium interface unit into the lower speed protocol.

12. The method according to claim 9, wherein determining and forcing further comprise determining whether an event signalling that the medium interface unit is to enter into the lower speed protocol has occurred and forcing the medium interface unit into the lower speed protocol in response to a determination that an event signalling that the medium interface unit is to enter into the lower speed protocol has occurred, independently of software of a host processor.

* * * * *